(12) United States Patent
Basmov (10) Patent No.: US 7,739,220 B2
(45) Date of Patent: Jun. 15, 2010

(54) CONTEXT SNIPPET GENERATION FOR BOOK SEARCH SYSTEM

(75) Inventor: Innokentiy Gennadyevich Basmov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 11/679,499

(22) Filed: Feb. 27, 2007

(65) Prior Publication Data

US 2008/0208833 A1   Aug. 28, 2008

(51) Int. Cl.
*G06F 17/30* (2006.01)
(52) U.S. Cl. .............. 707/3; 707/5; 707/8; 707/10; 707/104.1; 707/E17.05; 705/26
(58) Field of Classification Search ............ 707/3–4, 707/5, 8, 10, 104.1, E17.05; 705/26
See application file for complete search history.

(56) References Cited

U.S. PATENT DOCUMENTS

| | | | |
|---|---|---|---|
| 5,398,335 A * | 3/1995 | Lewis ........................... 707/3 |
| 5,412,807 A | 5/1995 | Moreland |
| 5,689,713 A * | 11/1997 | Normoyle et al. ............ 710/263 |
| 5,873,107 A * | 2/1999 | Borovoy et al. ............. 715/234 |
| 6,189,026 B1 | 2/2001 | Birrell et al. |
| 6,216,123 B1 * | 4/2001 | Robertson et al. .............. 707/3 |
| 2004/0039734 A1 | 2/2004 | Judd |
| 2004/0267725 A1 | 12/2004 | Harik |
| 2005/0198070 A1 * | 9/2005 | Lowry ..................... 707/104.1 |
| 2006/0026152 A1 | 2/2006 | Zeng et al. |
| 2006/0117002 A1 | 6/2006 | Swen |
| 2006/0161542 A1 | 7/2006 | Cucerzan et al. |
| 2006/0167864 A1 | 7/2006 | Bailey et al. |
| 2006/0242137 A1 | 10/2006 | Shah et al. |

FOREIGN PATENT DOCUMENTS

EP    0886227 A1    12/1998

OTHER PUBLICATIONS

Sergey Brin and Lawrence Page, "The Anatomy of a Large-Scale Hypertextual Web Search Engine," Proceeding of Seventh WWW Conference, Brisbane, Australia, 1998.

(Continued)

*Primary Examiner*—Tim T. Vo
*Assistant Examiner*—Shiow-Jy Fan
(74) *Attorney, Agent, or Firm*—Shook, Hardy & Bacon, LLP (57) ABSTRACT

A book search system and media for generating a book index corresponding to a collection of books and for providing context snippets related to a search string formulated by a user based on the book index are provided. The book index includes a word hash that represents unique words and an offset to a location list that stores locations for each instance of the unique word. The book search system receives the search string from the user, parses the search string to locate phrases and words, and traverses the book index to generate a list of locations for each word or phrase included in the search string. The book search system utilizes a variable-sized container having a maximum size to store subsets of each word or phrase included in the list of locations to generate the context snippets for the search string.

12 Claims, 5 Drawing Sheets

OTHER PUBLICATIONS

Brian Pinkerton, "Finding What People Want: Experiences with the WebCrawler," Proceedings fo the Second International WWW Conference, Chicago, Illinois, Oct. 1994.

Chuck Thacker and Ralph Sommerer, "A Prototype Electronic Book," (Unpublished but available on-line at http://research.microsoft.com/~som), Draft of Feb. 19, 1999.

* cited by examiner

CONTEXT SNIPPET GENERATION FOR BOOK SEARCH SYSTEM

BACKGROUND

Users have grown accustomed to searching for material relevant to a query over a network, such as the Internet. Conventionally, search systems receive a query having query words associated with web pages from a user and process the query to provide results to the user. The results include a listing of web pages that match the query. For each web page in the listing, a summary of the web page is provided. The summary allows the user to better understand content included in the web page. In the conventional search system, the summary of each web page is generated by processing each web page matching the query to detect a structure of the web page. The structure is based on tags included in the web page. Based on the detected structure of each web page, specific portions—such as paragraph and header sections—of the web page are searched to find all locations of the query words. In turn, sentences that are co-located with the query words included in the query are utilized to generate the summary.

It would be beneficial if users could search on-line book content to find books relevant to a particular search query, in a way similar to other on-line searches. But applying the conventional summary generation process utilized by conventional search systems to books introduces numerous performance issues. The conventional summary generation process is designed to process web pages. Typically, web pages are short structured documents that contain less than five pages. On the other hand, a book may be unstructured and may contain several hundred pages. Because a book is orders of magnitude larger than a web page, the conventional summary generation process is unable to provide a summary of an unstructured book that includes the query words in an acceptable period of time. The traversal of each page of the unstructured book to locate the query words creates a processing bottleneck that drastically reduces the time efficiency of the conventional summary generation process. In other words, when applied to unstructured books, the conventional summary generation process is too slow.

SUMMARY

A book index is generated and utilized by a book search system to respond to a search string received from a user. The book search system generates a book index for each book in a collection of books. The book index provides a hash for each unique word included in the book and an offset to a location that identifies the location of each instance of each unique word.

The book search system parses the search string to extract each phrase, word, or word sequences included in the search string. In turn, the book search system accesses the book index to obtain a list of locations for each word included in the search string. The list of locations may be utilized to verify that the book contains the words, word sequences, or phrases included in the search string. The book search system also generates a phrase list that includes locations for each phrase specified in the search string and included in books contained in the collection of books.

Additionally, the book search system may generate a context snippet for the search string based on the location of the words or phrases in the books contained in the collection of books. A context snippet may include other words or phrases that surround the words or phrases included in the search string. The other words or phrases may be extracted from the book index or from books include in the collection of books. The other words or phrases may provide a user with a context for each word or phrase included in the search string. The book search system utilizes a variable-sized container to store words or phrases that are included in the search string and the phrase list or list of locations. Also, the variable-sized container may store the other words or phrases that are proximate to the words or phrases included in the search string. The variable-sized container may store varying combinations of the words or phrase included in the search string. Each combination of the words or phrases may be assigned a rank based on, among other things, a number of unique words. In response to the search string provided by the user, the book search system may communicate, among other things, the variable-sized container having the best rank. Accordingly, the variable-sized container is designed to provide the user with a context snippet that best matches the search string.

This Summary is provided to introduce a selection of concepts in a simplified form. The selection of concepts are further described below in the Detailed Description. This Summary is not intended to identify key features or essential features of the claimed subject matter, nor is it intended to be used as an aid in determining the scope of the claimed subject matter.

DETAILED DESCRIPTION

This patent describes the subject matter pursued for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps disclosed unless and except when the order of individual steps is explicitly described. Further, embodiments are described in detail below with reference to the attached drawing figures, which are incorporated in their entirety by reference.

As utilized throughout this description, the term "component" refers to any combination of software, firmware, and hardware. Additionally, as utilized throughout this description, the term "phrase" refers to a small group or collocation of words that includes at least two words and a word sequence.

A book search system is provided that generates a variable-sized container to present context snippets of a book based on search strings received from users. The book search system processes the search string to locate the phrases or words included in the search string. In an embodiment, an index engine generates a book index for each book in a collection of books. The book search system utilizes the book index generated by the index engine to efficiently locate the words or phrases included in the search string. In turn, the book search system may populate the variable-sized container with varying combinations of the words or phrases included in the book and search strings to provide the context snippets associated with the search strings received from the users.

Figure 1:
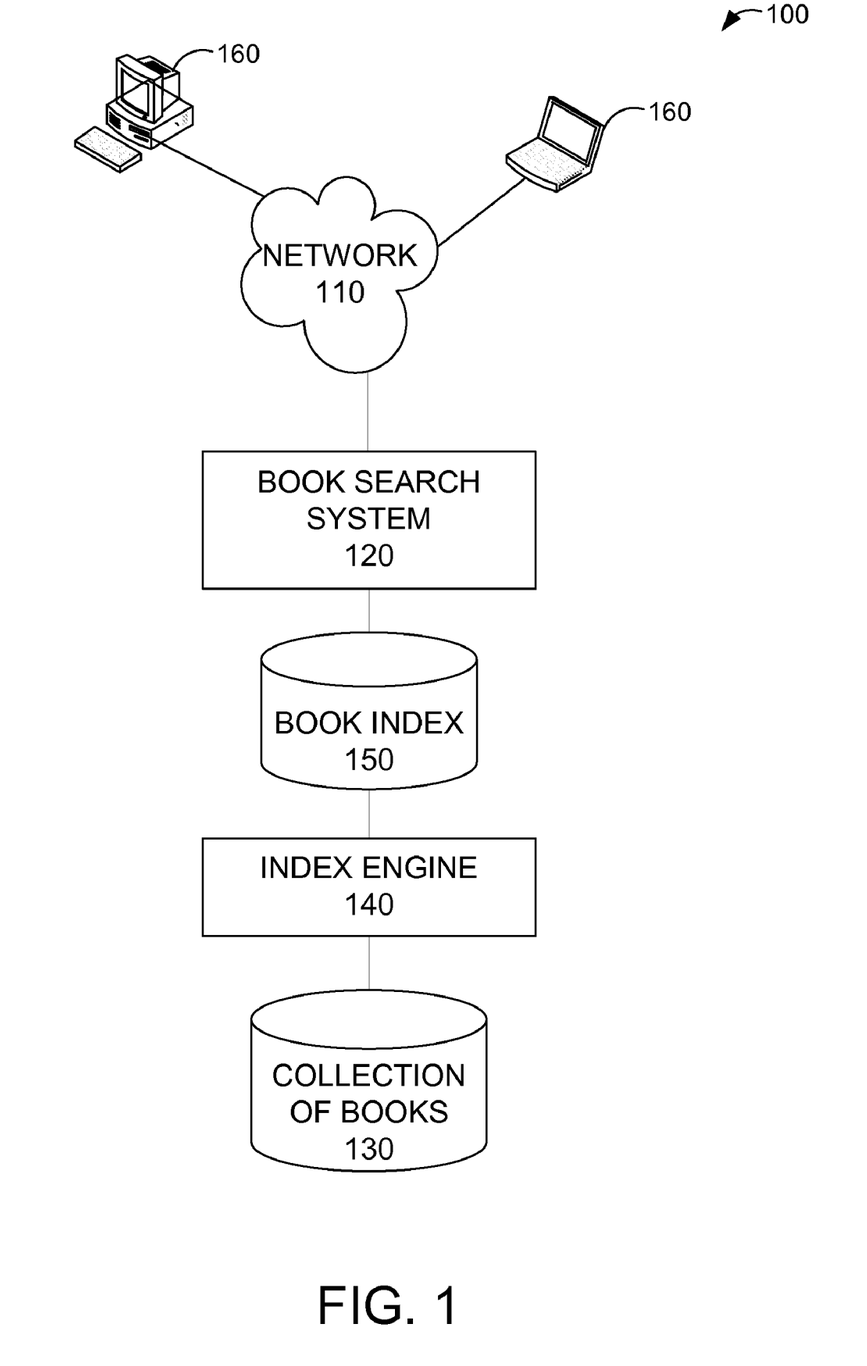
FIG. 1 is a network diagram that illustrates an exemplary operating environment.

FIG. 1 is a network diagram that illustrates an exemplary operating environment 100. The operating environment includes a network 110, a book search system 120, a collection of books 130, an index engine 140, a book index 150, and client devices 160.

The network 110 is configured to facilitate communication between the client devices 160 and the book search system 120. The network 110 may be a communication network, such as a wireless network, local area network, wired network, or the Internet. In one embodiment, one or more of the client devices 160 communicate search strings to the book search system 120 utilizing the network 110. In response, the book search system 120 may communicate, among other things, a variable-sized container that provides responsive context snippets based on the search strings received from client devices 160.

The book search system 120 is a server computing device. The book search system 120 parses the search string provided by the client devices 160 to identify phrases and words included in the search string. The book search system 120 generates a phrase list and a variable-sized container based on the identified words and phrases. The book search system 120 generates a phrase list to store locations for each phrase included in the search string. The book search system 120 utilizes the book index 150 to locate words or phrases included in one or more books provided by the collection of books 130. In some embodiments, in response to the search strings, the book search system 120 provides context snippets in a variable-size container. The book search system 120 may utilize the phrase list and location lists to generate the variable-sized container. The variable-sized container stores combinations of the words or phrases extracted from the search string. Additionally, the variable-sized container may store other words or phrases that are extracted from the collection of books 130. The other words or phrases are proximate to the words or phrases found in the search string. Thus, the variable-sized container may provide texts from one or more books in the collection of books 130, where the text surrounds the phrases or words included in the search string.

The collection of books 130 is a database that stores books in electronic format. The collection of books 130 may include books that are unstructured. The unstructured books do not include any markup language tags. The unstructured books are stored in the collection of books 130 to await indexing by the index engine 140.

The index engine 140 communicates with the collection of books 130 to create a book index 150. Book index 150 stores a book data structure for each book in the collection of books 130. The index engine 140 pre-processes each book to generate the book data structure. The book data structure identifies locations of words in the book. The index engine 140 identifies unique words included in each book and determines a location for each unique word. In certain embodiments, each character included in each book in the collection of books 130 is enumerated and associated with a numerical identifier. Also, each word included in each book in the collection of books 130 is enumerated and associated with a numerical identifier. Accordingly, character and word locations for each unique word in each book in the collection of books 130 are identified and stored in the book data structure. In some embodiments, books in the collection of books 130 may be static because there are no updates for the books; thus, the book data structure associated with each book is generated once. In an alternate embodiment, when books in the collection of books 130 are periodically updated, the book data structure associated with each updated book is modified to reflect the change.

The book index 150 is a database that stores the book data structures generated for each book in the collection of books 130. The book index 150 stores the pre-processed index information representing locations of words within each book in the collection of books 130. The book search system 120 accesses the book index 150 to process the search strings received from the client devices 160. The book index 150 provides locations for the words included in the search string. Also, the book search system 120 may utilize the book index 150 to provide context snippets from each book in the collection of books 130. The book data structures stored by the book index 150 are further described with reference to FIG. 2.

As stated above, the client devices 160 may be utilized by a user to provide search strings to the book search system 120 via the network 110. The results corresponding to the search string identify specific books that are of interest to a user of the client device 160. Each client device 160 may include, without limitation, personal digital assistants, smart phones, laptops, personal computers, or any other suitable computing device. The client devices 160 are configured to receive the results corresponding to the search string from the book search system 120. The received results corresponding to the search string may include a collection of the context snippets that are ranked based on, but not limited to, word frequency and word uniqueness.

One of ordinary skill in the art understands and appreciates that operating environment 100 has been simplified for description purposes and that alternate operating environments are within the scope and spirit of the above description.

The book search system utilizes a book index to generate phrase lists and context snippets. In some embodiments, the book index includes book data structures that provide location information for each word included in the search string. Each book data structure may include a header that associates the book data structure with a book in a collection of books. Additionally, the header may store each unique word contained in the book and an offset to a location list that identifies the location of each instance of each unique word. In some embodiments, the book data structure is organized to reduce the amount of memory needed to store the book data structure.

Figure 2:
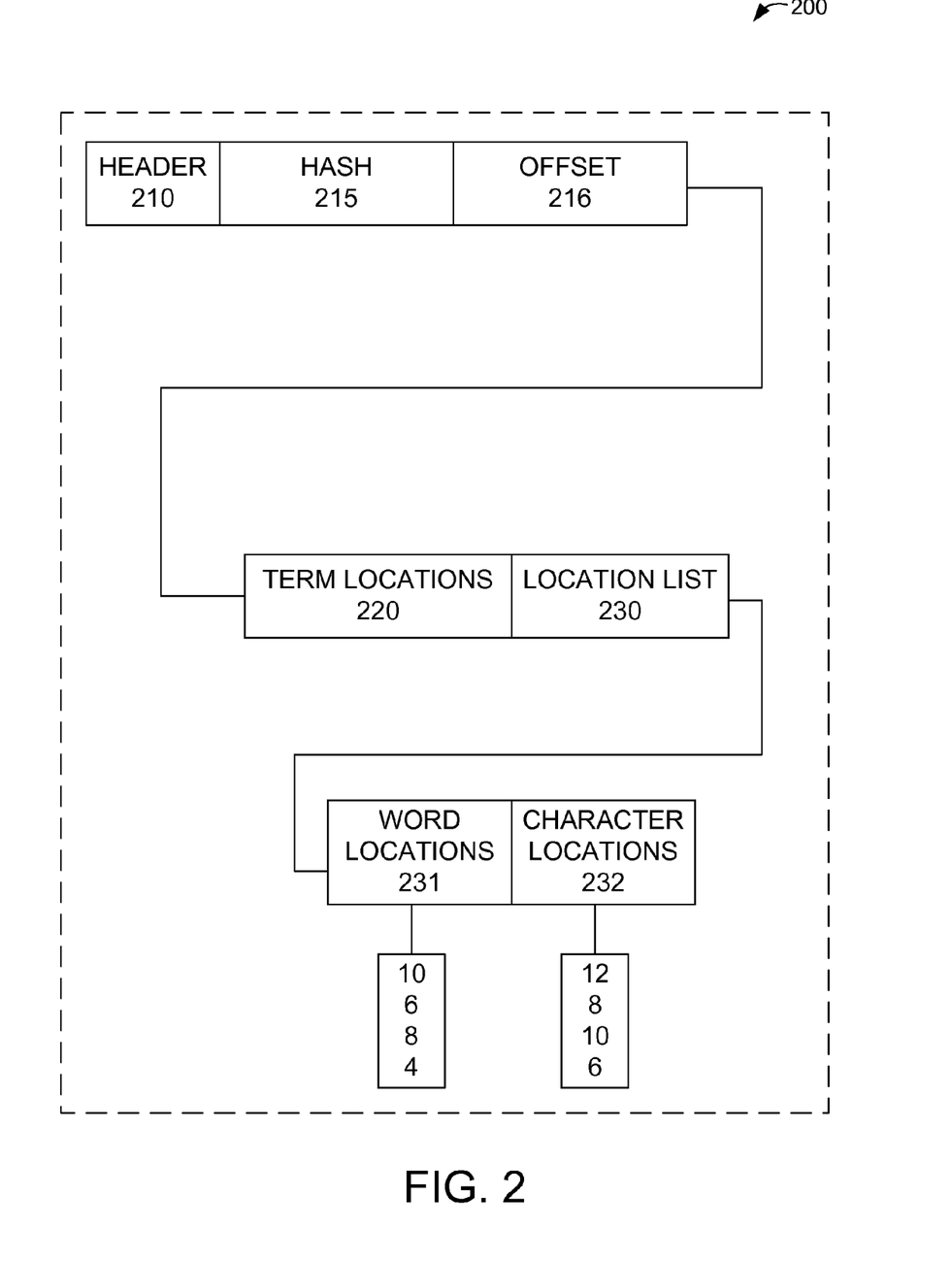
FIG. 2 is a data structure diagram that illustrates an exemplary book data structure included in a book index.

FIG. 2 is a data structure diagram that illustrates an exemplary book data structure 200 included in a book index. The book data structure includes a header section 210 and a term locations section 220.

The header section 210 provides a number of entries that represent the number of unique words in the book associated with the book data structure 200. Each entry in the header section 210 includes a hash 215 of the unique word and an offset 216 to the term locations section 220. In an embodiment, the hash 215 of each unique word may be a Message Digest 5 of the unique word. The offset 216 is a pointer to the term locations section 220.

The term locations section 220 of the book data structure 200 includes a location list 230 that provides a location for the unique word associated with the offset 216. The location list 230 is a list that contains position information of all instances of the unique word. The location list 230 may include word locations 231 and character locations 232 for every unique word included in the book associated with the book data structure 200. When the unique word is associated with multiple instances in the book, the location list 230 for the unique word contains multiple pairs of word locations 231 and character locations 232.

The word locations 231 are locations that identify a position within the book. Preferably, all words in the book are enumerated by an index engine. For instance, each word $W_0$ through $W_n$ in the book is associated with numerical identifiers, where 0 through n are numerical identifiers such as 0, 1, 2, 3 . . . n. Accordingly, the word locations 231 represent a numerical orientation of a particular word in relation to other words in the book.

The character locations 232 is the location of the first character of the word identified by each location in the word locations 231. In an embodiment, all characters in the book are enumerated by the index engine. The character locations 232 represent a numerical orientation of a first character of each word identified by the word locations 231 in relation to the other characters in the book.

In an alternate embodiment, the term locations section 220 may be a separate and independent term location index that is generated for each book in the collection of books. The term location index stores location information, i.e., word locations and character locations, for each unique word used within a book. Each term location index for each book in the collection of books is unrelated to other term location indices.

To reduce the memory requirements for storing word locations 231 and character locations 232, each location 231 and 232 for subsequent occurrences of each unique word may be represented by deltas. The book data structure stores the delta as a difference between a previous occurrence and a current occurrence of each unique word. For instance, a first occurrence of a unique word appears at word location 1,000,000 and a second occurrence of the word appears at location 1,000,100. The word locations 231 stores the first occurrence of the unique word as 1,000,000, but the second occurrence is stored as 100, which is the difference between the location of the first occurrence and the second occurrence. In bits, the memory required to store the first word location 1,000,000 is approximately 20. The memory required to store the second word location delta is approximately 7 bits. This generates an approximate saving of 13 bits in storing the first and second locations. Therefore, the memory required to store subsequent occurrences of the same word is reduced.

The book index stores book data structures 200 that efficiently represent the locations of unique words in each book in the collection of books. The book search system utilizes the book index to generate a response to the search string that includes, among other things, context snippets corresponding to the search string.

The context snippets are generated by traversing a book index to locate words or phrases included in the search string. Once the locations of the words and phrases are determined, the book search system generates varying combinations of the words and phrases and assigns a rank to each of the varying combinations. The varying combinations may include other words or phrases included in the book index. The other words or phrases included in the varying combinations are proximate to the words or locations included in the search string. After assigning the rank to the varying combinations, the book search system may return a combination with a high rank, when compared to ranks of the other combinations, as a best context snippet.

Alternatively, the book search system may generate the context snippets by extracting text surrounding words or phrases included in the search string directly from a book included in the collection of books by utilizing the character locations and word locations stored in the book index. The book search system processes the character and word locations to generate a phrase list that includes the location of each phrase included in the search string. In turn, the book search system may utilize the phrase list, character locations, and word locations to load a portion of a book associated with the book data structure into memory. The book search system directly extracts text surrounding the phrase or words included in the search string. The book search system stores the extracted text and the phrases or words included in the search string in a context snippet. The context snippet is presented to the user in response to the search string.

Figure 3:
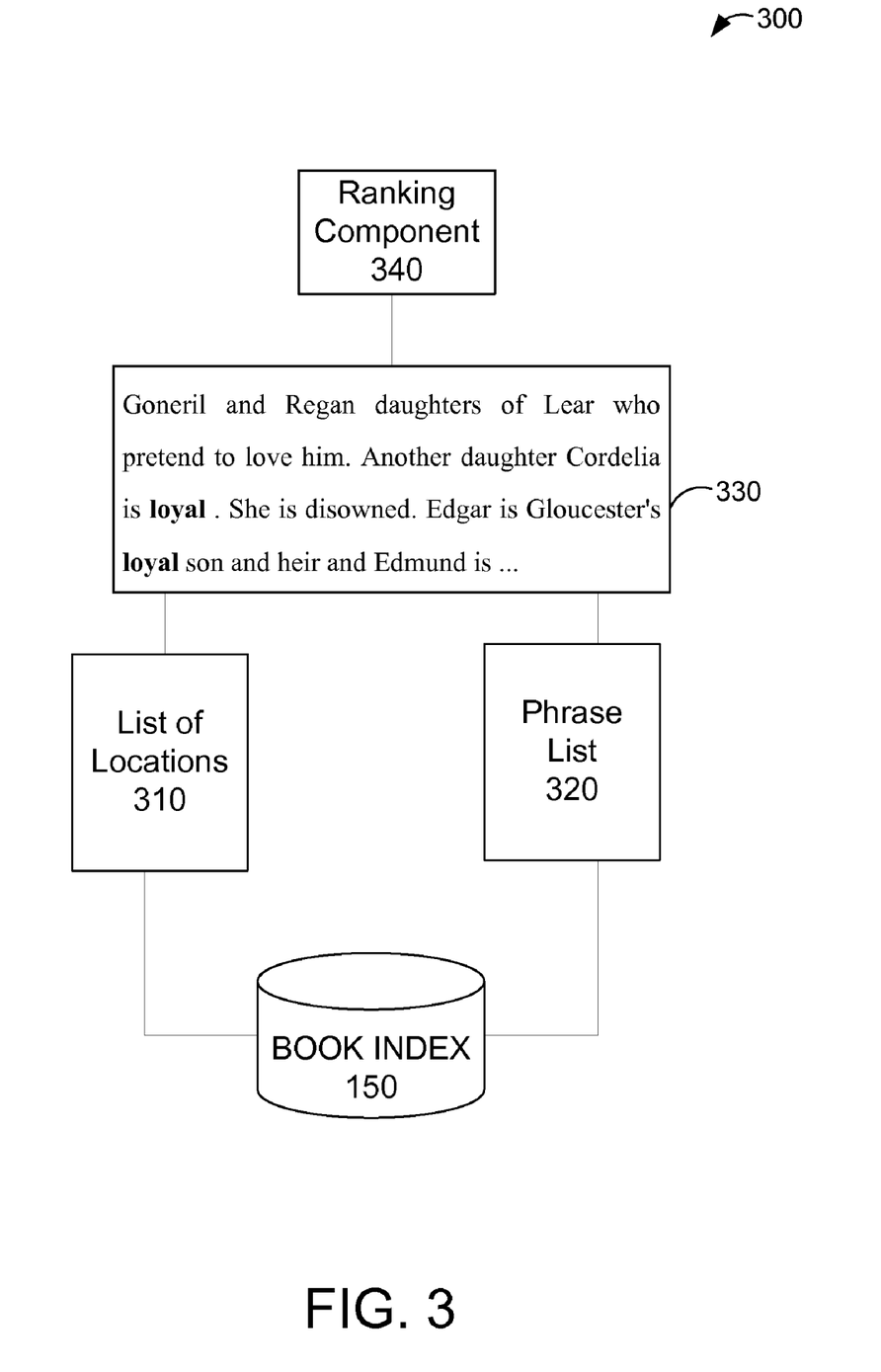
FIG. 3 is a block diagram that illustrates components of a book search system that utilizes the book index.

FIG. 3 is a block diagram that illustrates components of a book search system 300 that utilizes the book index 150 of FIG. 1. The book search system 120 of FIG. 1 is further defined with reference to the book search system 300 in FIG. 3 The book search system 300 includes a list of locations 310, a phrase list 320, a variable-sized container 330, and a ranking component 340. The book search system is communicatively connected to the book index 150, which provides position information to the book search system 300 based on the search string.

The list of locations 310 represents a stack that stores word and character locations provided by the book index 150 based on the words included in the search string. In an embodiment, the list of locations 310 may be sorted based on position. Also the list of locations 310 may store words associated with the locations specified in the stack. The book search system 300 may communicate locations and words in the list of locations 310 to the variable-sized container 330 to provide the variable-sized container 330 the words and the location of the words.

In an embodiment, the book search system 300 generates the phrase list 320 for each book in the collection of books based on phrases included in search strings. The phrase list 320 identifies the location of the phrases in the collection of books. The phrase list 320 represents a stack that stores phrases and phrase locations based on the word and character locations provided by the book index. The book search system 300 communicates the locations and phrases included in the phase list 320 to the variable-sized container 330 to provide the variable-sized container 330 the phrases and the location of the phrases.

The variable sized-container 330 receives phrases, words, character locations, phrase locations and word locations from the list of locations 310 and the phrase list 320. The variable-sized container 330 may be a queue or double-ended queue that stores character, word, and phrase locations and the phrases and words that match the phrases and words included in the search string. Additionally, the variable-sized container 330 is configured to store other words or phrases that surround the words or phrases included in the search string. The other words or phrases surrounding the words or phrases included in the search string may be added to a front or back of the variable-sized container until a maximum size threshold is satisfied. For instance, a search string that includes the word "loyal" may populate the variable sized container 330 with other words or phrases that surround the word "loyal" from a book that includes occurrences of the word "loyal." The other words or phrases surrounding the word included in the search string is stored in the variable-sized container 330. The book search system 300 may extract text surrounding a word or phrase included in the search string by utilizing the locations stored by the variable-sized container. The book search system 300 may traverse the book index 150 to locate and extract other word or phrases that are within a radius, i.e., 30 words, of the locations stored by the variable-sized container 330. Alternatively, the book search system 300 may utilize the locations stored in the variable-sized container 330 to locate and extract the other words or phrases surrounding the words or phrases stored in the variable-sized container 330 directly from a portion of the book in the collection of books that corresponds to the locations stored in the variable sized container 330. In certain embodiments, the other words or phrases extracted directly from the portion of the book may be represented as an image. The image may be stored as a background in the variable sized container 330. The book search system 300 may communicate a portion of the variable-sized container 330 to the user that generated the search string based on a rank assigned to the variable-sized container 330 by a ranking component 340.

The ranking component 340 may assign a rank to the variable-sized container 330 based on the number of unique matches included in the variable-sized container 330. Each combination of words and phrases included in the variable-sized container is assigned a rank by the ranking component 340. The highest ranking combination of words and phrases may be communicated as a context snippet to the user in response to the search string. In an alternate embodiment, the results of the search string may include a ranked listing of the combination of words and phrases that are stored in the variable-sized container 330.

Accordingly, the book search system may utilize the book index or portions of a book to generate context snippets based on the words or phrases that are included in the search string. The book search system provides the context snippets, in response to the search string, based on the rank assigned to those context snippets.

In an embodiment, a search string may include phrases such as, i.e., Antigua beaches enclosed in quotations. When the book search system receives the search string, the book search system traverses the book index to locate instances of Antigua and beaches. Because the search string included quotations that grouped Antigua with beaches, the book search system filters the locations to provide only locations that include the sequence identified in the search string: Antigua followed by beaches. When the sequence is identified in the book index, the book search system generates a phrase list that includes, among other things, the word and character locations for the phrase.

Figure 4:
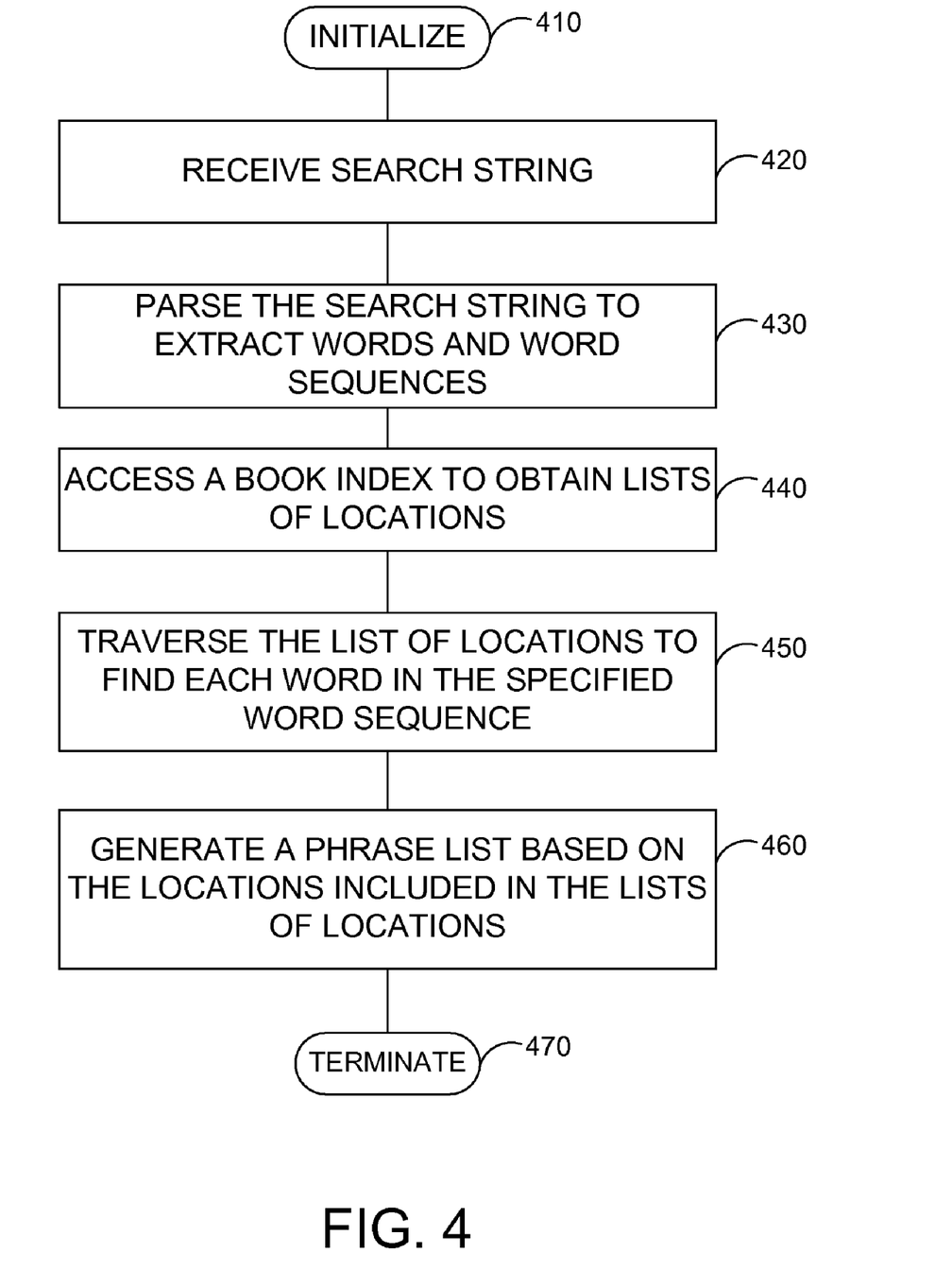
FIG. 4 is a flow diagram that illustrates an exemplary method to extract phrases related to a book in a collection of books.

FIG. 4 is a flow diagram that illustrates an exemplary method to extract phrases related to a book in a collection of books. In step 410, the method is initialized to process search strings that include one or more phrases. In step 420, a search string is received by the book search system. In step 430, the search string is parsed by the book search system to extract words and word sequences. In step 440, a book index is accessed to obtain lists of locations for the words included in the search string. In step 450, the lists of locations are traversed by the book search system to filter locations that fail to satisfy the word sequence. In step 460, the book search system generates a phrase list based on the locations included in the lists of locations. In step 470, the method terminates.

In an embodiment, generating the phrase list as described in FIG. 4 is performed by the following psuedocode.

---

Variables:
1. i - index of the current query word;
2. PrevWord - stores a word and a location of the phrase word that follows the current word; (the algorithm analyzes phrase words in reverse order).
3. CurrWord - stores a word and a location of the current phrase word
4. Phrase words W1, ..., Wn
5. Lists of locations of the phrase words in ascending order (L1...Ln)

Init:
1. The list of phrase locations is empty;

Steps:
1. L1: PrevWord = MAX_UINT32;
2. i = n; (last word of the phrase)
3. L2: If the location list of the i-th word is empty, go to [EXIT].
4. Select next location of Wi and store it in CurrWord.
5. If PrevWord < CurrWord, go to [L1] (Skip to the next phrase candidate).
6. Remove the current word location from the list.
7. If (PrevWord − 1)== (CurrWord), go to [L3].
8. Go to [L2].
9. L3: If i == 1, add phrase location to the list of phrase locations, go to [L1].
   Else, set PrevWord to CurrWord.
10. i = i − 1; go to L2;
11. EXIT:

---

The book search system may execute an implementation of the psuedocode above after the book search system detects a search string that includes phrases. The book search system may detect that the search string includes a phrase by checking for quotation marks and checking that more than one word is included within the quotation marks. In turn, the psuedocode checks a book index to ensure that each word included in the search string is located in the book. Also, the psuedocode checks the locations associated with each word to verify that the book index contains the words in a sequence identical to a sequence of the phrase include in the search string. After the psuedocode verifies that the entire phrase is represented in the book index, a phrase list is generated to store the phrase and location information provided by the book index.

As illustrated in the variables section of the psuedocode, a set of variables are created to store data produced when executing the psuedocode in the memory of the book search system. The variables may include a counter "i," and storage elements "PrevWord," "CurrWord," "$W_i$;" and "$L_i$." The counter "i" is utilized in an index to traverse each word, "$W_i$;" is included in the phrase provided by the search string. The "PrevWord" storage element stores a word "$W_i$;" and the location of the word. The "CurrWord" storage element stores a word "$W_{i-1}$;" and the location of the word. The storage element "$W_i$" stores all words included in the phrase detected by the book search system. The storage element "$L_i$" is a list of locations associated with each word "$W_i$." included in a phrase provided by the search string.

When the psuedocode is initialized, the book search system utilizes the book index to populate "$L_i$" with locations associated with each word included in the phrase provided by the search string. In some embodiments, the words included in the phrase are checked in reverse order when generating the phrase list. The counter "i" is set to the number of words included in the phrase. The list "$L_i$" associated with the last word "$W_i$." is checked to determine if the list "$L_i$" is empty. When the list "$L_i$" associated with the last word is empty, the book search system terminates phrase list generation. When the list "$L_i$" associated with the last word is not empty, the last word "$W_i$." is stored in "PrevWord" and the next to last word "$W_{i-1}$." is stored in "CurrWord." Additionally, the locations associated with the last word and next to last word are stored in "PrevWord" and "CurrWord," respectively. In turn, the order of the locations are checked to ensure that the location stored in "PrevWord" is after the location stored in "CurrWord." When the location of "CurrWord" is after the location of "PrevWord," the book search system is informed that the current phrase is not in a book included in the collection books. Additionally, the psuedocode restarts to locate other phrases that are included in the search string. When the location of "CurrWord" is before the location of "PrevWord," the pseudocode may delete list "$L_{i-1}$" that stores the locations of "CurrWord." A proximity of the words are checked by verifying that a location of "PrevWord" minus one is equal to a location of "CurrWord." When the proximity is not verified to be one word, the pseudocode may terminate. When the proximity is verified to be one word, a check is made to determine if the counter "i" is equal to one, which indicates that the first word of the phrase is stored in "PrevWord." In this case, the phrase provided by the search string and located in the book index is added to a phrase list and the locations are stored in the phrase list. If the counter "i" is not equal to one, the counter is decremented by one, and the pseudocode continues to check the locations of the other words included in the phrase provided by the search string. In an alternate embodiment, the words included in the phrase may be checked in forward order by starting from the first word.

In certain embodiments, the book search system utilizes the list of locations and phrase locations to provide context snippets that correspond to a search string. In some embodiments, while the context snippet is being generated by the book search system, a rank for the context snippet is calculated and assigned to the context snippet. Additionally, the size of the context snippet is checked to determine if the current length exceeds a size limit associated with the context snippet. When the size is exceeded, appropriate actions are taken to reduce the size of the context snippet. The book search system may communicate the context snippet, in response to the search string, based on the assigned rank.

Figure 5:
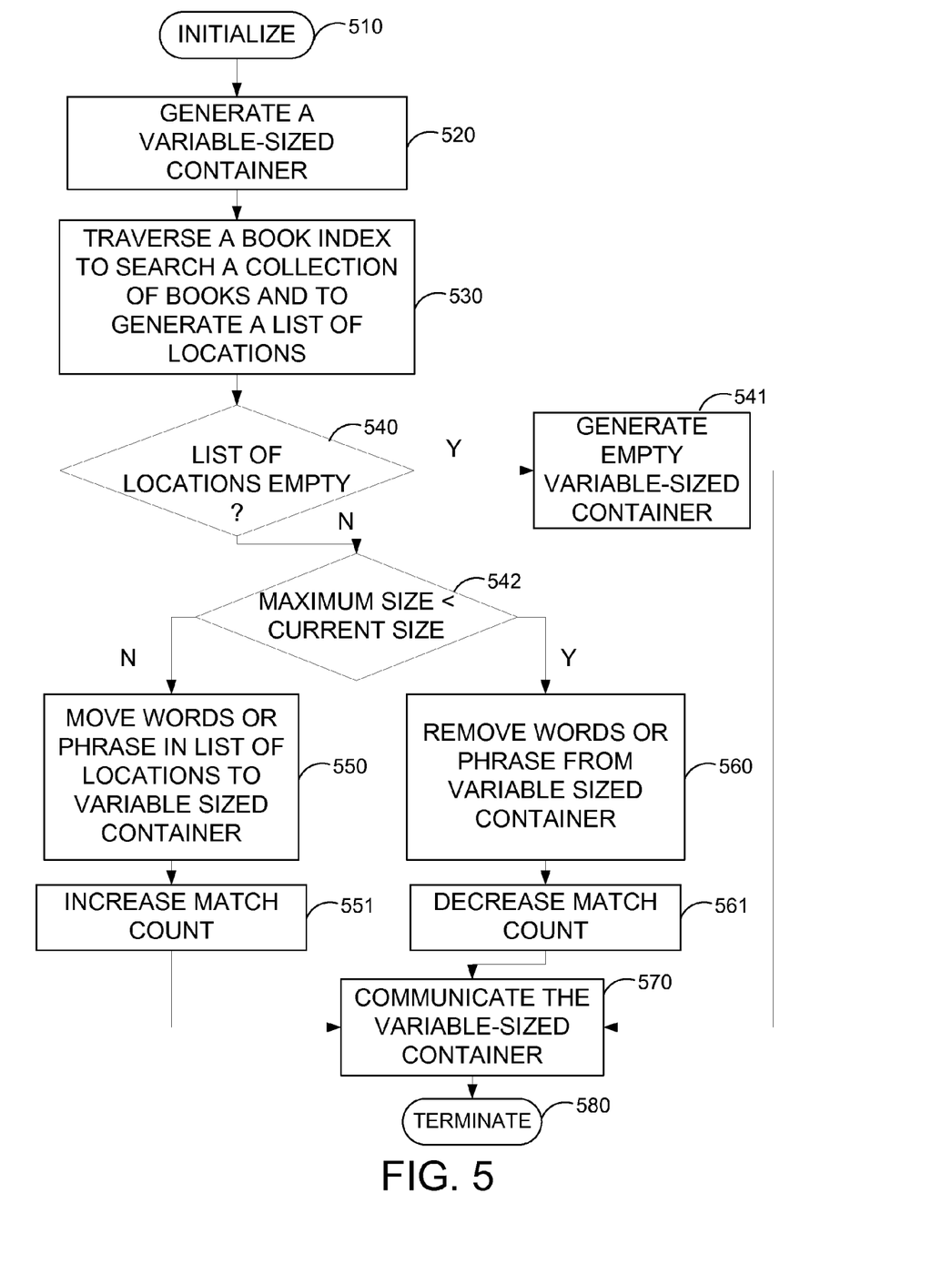
FIG. 5 is a flow diagram that illustrates an exemplary method to generate a context snippet from a collection of books.

FIG. 5 is a flow diagram that illustrates an exemplary method to generate a context snippet from a collection of books. In step 510, the method is initialized to process search strings. In step 520, a variable-sized container is generated by the book search system to store context snippets. In step 530, the book search system traverses the book index to search the book data structures associated with each book in the collection of books and to generate a list of locations for each word, and phrase lists for each phrase included in the search string. In step 540, the list of locations and phrase lists are checked to determine whether the lists are empty. When the lists are empty, in step 541, an empty variable-sized container is generated. In turn, the book search system communicates the empty variable-sized container to a client that generated the search string in step 570. When the lists are not empty, in step 542, the current size of the variable-sized container is checked to determine whether a maximum size associated with the variable-sized container is violated. When the maximum size is violated, in step 560, a phrase or word of the appropriate size is removed from the variable-sized container. In turn, a match count is decreased to reflect the change in step 561. In step 570, the book search system communicates the variable-sized container to the client based on a rank assigned to the variable-sized container, where the rank is calculated from, but not limited to, the match count. When the maximum size is not violated, in step 550, the words or phrases are added to the variable-sized container from the list of locations or from the phrase lists. In turn, the match count is increased to reflect the matches contained in the variable-sized container in step 551. In step 570, the book search system communicates the variable-sized container to the client based on the rank assigned to the variable-sized container, where the rank is calculated from, but not limited to, the match count. In some embodiments, when the variable-sized container is less than the maximum size, the book search system extracts other words or phrases from the list locations, the phrase lists, or the book index. The book search system extracts other words or phrases such that the collective size of the extracted other words or phrases is not more than half of the difference between the maximum size of the variable-sized container and the current size of the variable-sized container. The method terminates in step 580.

In an embodiment, generating the context snippet as descried in FIG. 5 is performed by the following psuedocode.

---

Variables:
Location stacks for each of the query words/phrases;
Current snippet - a queue that contains matching words within current "window";
Match counter for each of the query words within current snippet;
Unique counter is a number of unique matches for each of the query words within the current snippet;
Snippet rank
Best seen snippet - includes locations, ranking feature values, words, rank;
MaxSnippetSize
Init:
    1. Current snippet is empty;
    2. Match counters are set to zero;
    3. Best seen snippet is set to not initialized;
Steps:
    1. L1: If all of the location stacks are empty, go to L2;
    2. Select minimum of locations on top of location stacks and pop it; [word A]
    3. Enqueue word A to the current snippet queue;
    4. Increase the corresponding match counter;
    5. While snippet exceeds the size limit (MaxSnippetSize), dequeue words from the head of the current snippet queue and decrease corresponding match counters;
    6. Calculate the number of unique matches, which is a ranking feature of the snippet rank;
    7. If there is no best seen snippet or the snippet rank of the current snippet is higher than the snippet rank of the best seen snippet, replace the best seen snippet with the current snippet.

-continued

8. Go to [L1].
9. L2: If the length of the best snippet (BSL) is less than MaxSnippetSize, add terms from the (MaxSnippetSize − BSL)/2 neighborhood of the snippet before and after the snippet. Exit.

The book search system may execute an implementation of the pseudocode above after the book search system generates the phrase list. The book search system may utilize the phrase list and lists of locations to create the variable-sized container that provides the context snippets. The executed implementation of the pseudocode causes the book search system to add words or phrases provided by the phrase list and lists of locations to the variable-sized container. In turn, the variable-sized container is ranked and the variable-sized container with the highest rank is communicated to the client device.

As illustrated in the variables section of the pseudocode, a set of variables are created to store data produced when executing the pseudocode in the memory of the book search system. The variables may include counters: "match counter" and "unique counter." The variables also include storage elements: "location stacks," "current snippet queue," "best snippet queue," and "snippet rank." Additionally, the variables include a constant "MaxSnippetSize" that sets the maximum size of the context snippet. The "match counter" is a count of the number of words stored in the "current snippet queue," where the words are included in the search string. The "unique counter" is a count of the number of unique words stored in the "current snippet queue," where the unique words are also included in the search string. The "location stacks" store locations associated with each word or phrase provided by the search string. The "location stacks" are populated by the phrase list associated with each phrase and the list of locations associated with each word. The "current snippet queue" stores words and phrases provided by the "location stacks." Additionally, the locations of the words and phrases included in the "location stacks" are stored by the "current snippet queue." The "best snippet queue" stores the highest ranking "current snippet queue." The "best snippet queue" stores a "snippet rank" assigned to the highest ranking snippet queue and the ranking information utilized to calculate the "snippet rank." The "snippet rank" stores the rank calculated by the pseudocode for the "current snippet queue."

When the pseudocode is initialized, the book search system utilizes the phrase list and list of location to populate the "locations stacks." Moreover, the "match counter" and "unique counter" are set to zero and the "current snippet queue" is empty. When the "location stacks" are empty, the pseudocode does not generate the variable-sized container to store the context snippet. When the "location stacks" are not empty, a word or phrase stored in the "location stack" is moved from the "location stack" to the "current snippet queue." The "current snippet queue" also receives and stores the location of the word or phrase from the "location stack." The "match counter" is incremented when the "current snippet queue" stores the words or phrases received from the "location stacks." In turn, the size of the "current snippet queue" is checked to determine whether a current size of the "current snippet queue" exceeds the "MaxSnippetSize." When the "MaxSnippetSize" is exceeded, words or phrases are removed from the "current snippet queue" until the current size falls below the "MaxSnippetSize." Also, the "match counter" is decremented to reflect the change in the "current snippet queue." When "MaxSnippetSize" is not exceeded, the pseudocode calculates a count of unique matches included in the "current snippet queue" and stores the count in the "unique counter." In an embodiment, the pseudocode may calculate the "snippet rank" by totaling "match counter" and "unique counter" and dividing the total by "MaxSnippetSize." The "snippet rank" is compared with a "snippet rank" corresponding to the "best snippet queue." When the "snippet rank" corresponding to the "best snippet queue" is less than the "snippet rank" of the "current snippet queue," the "best snippet queue" is replaced with the "current snippet queue" and the "snippet rank" corresponding to the "best snippet queue" is replaced with the "snippet rank" of the "current snippet queue." When the "snippet rank" corresponding to the "best snippet queue" is greater than "snippet rank" of the "current snippet queue," the "best snippet queue" is not changed. In turn, the pseudocode checks the "location stacks" to determine whether the "location stack" is empty. When the "location stack" is not empty, the pseudocode continues to add words or phrases to the "current snippet queue." When the "location stack" is empty, the pseudocode compares the current size of the "best snippet queue" to the "MaxSnippetsize." When the current size of the "best snippet queue" is less than the "MaxSnippetsize," other words or phrases in locations surrounding the words or phrases included in the "best snippet queue" are added to the "best snippet queue." The collective size of the other words or phrases is constrained to the difference between the "MaxSnippetsize" and the current size of the "best snippet queue." After the "best snippet queue" is updated, the words and phrases included in the "best snippet queue" may be presented to a user that provided the search string.

In summary, a book search system that generate phrase lists and context snippets in response to a search string is provided. The book search system utilizes a book index that stores book data structures that efficiently represent words and word locations to generate phrase lists and the context snippets. The book search system provides results that include, among other things, a context snippet that has the best rank. The rank is based on frequency and uniqueness of words that are included in the context snippet and the search string.

The foregoing descriptions of the invention are illustrative, and modifications in configuration and implementation will occur to persons skilled in the art. For instance, while the present invention has generally been described with relation to FIGS. 1-5, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The invention claimed is:

1. One or more computer-readable storage media having computer-executable instructions embodied thereon that perform a method for extracting a phrase related to a book in a collection of books, the method comprising:

receiving a search string having one or more phrases specified by a user, wherein the phrases include one or more words;

parsing the search string to extract each word and word sequence for the one or more phrases;

accessing a book index corresponding to a collection of books to obtain a list of locations for each word in the one or more phrases, wherein accessing a book index comprises locating a hash corresponding to each word and loading an offset associated with the hash to obtain the list of locations;

traversing the list of locations to find each word in the word sequence specified by the one or more phrases of the search string;

generating a phrase list having the location of the one or more phrases of the search string based on the locations included in the list of locations for each word; and generating a variable-sized container, associated with a maximum size, to store snippets corresponding to the collection of books based on the search string.

2. The media of claim 1, wherein the phrase list includes deltas to represent similar phrases.

3. The media of claim 1, wherein the location of each phrase is based on the location of at least one word in the phrase.

4. The media of claim 1, further comprising selecting a specific book in the collection of books based on the search string.

5. The media of claim 1, wherein the word sequence includes an enumeration for each phrase in the search string.

6. The media of claim 1, wherein generating a phrase list comprises for each phrase, checking each location corresponding to each word to determine whether the word sequence is satisfied.

7. The media of claim 6, further comprising adding the phrase to the phrase list when the word sequence is satisfied.

8. The media of claim 6, further comprising selecting and checking another phrase included in the search string, when the word sequence is not satisfied.

9. A book search system having one or more computer-readable storage media configured to provide a data structure for processing searches related to a collection of books, the data structure comprising:

one or more headers to store a hash for each unique word in the collection of books and an offset to a location list that provides the location of each instance of the unique word;

the location list is accessible via the offset and includes word location and character location pairs for each instance of each unique word in the collection of books, wherein word locations and character locations of each subsequent instance is represented as delta to a previous instance of the unique word;

the location list is searchable to obtain all locations for each word included in a search string; and generating a variable-sized container associated with a maximum size, to store snippets corresponding to the collection of books based on the search string.

10. The book search system of claim 9, wherein the header is sorted based on the hash for each unique word.

11. The book search system of claim 9, wherein each book in the collection of books has a corresponding header.

12. One or more computer-readable storage media having computer-executable instructions embodied thereon that perform a method for extracting a phrase related to a book in a collection of books, the method comprising:

receiving a search string having one or more phrases specified by a user, wherein the phrases include one or more words;

parsing the search string to extract each word and word sequence for the one or more phrases;

accessing a book index corresponding to a collection of books that includes unstructured books, which lack markup language tags, to obtain a list of locations for each word in the one or more phrases, wherein accessing a book index comprises locating a hash corresponding to each word and loading an offset associated with the hash to obtain the list of locations;

traversing the list of locations to find each word in the word sequence specified by the one or more phrases of the search string;

generating a phrase list having the location of the one or more phrases of the search string based on the locations included in the list of locations for each word; and generating a variable-sized container, associated with a maximum size, to store snippets corresponding to the collection of books based on the search string.

* * * * *